(12) United States Patent
Brown et al.

(10) Patent No.: US 7,832,233 B2
(45) Date of Patent: Nov. 16, 2010

(54) METHOD OF MAKING STAGED BURNOUT ENAMELS FOR SECOND SURFACE FIRING OF MULTILAYER GLASS STRUCTURES

(75) Inventors: Terry J. Brown, Pittsburgh, PA (US); George E. Sakoske, Washington, PA (US)

(73) Assignee: Ferro Corporation, Cleveland, OH (US)

( * ) Notice: Subject to any disclaimer, the term of this patent is extended or adjusted under 35 U.S.C. 154(b) by 440 days.

(21) Appl. No.: 11/131,919

(22) Filed: May 18, 2005

(65) Prior Publication Data

US 2006/0260734 A1 Nov. 23, 2006

(51) Int. Cl.
C03B 40/00 (2006.01)
(52) U.S. Cl. .............................. 65/24; 65/33.4; 65/33.6; 65/60.53; 65/60.51; 65/106; 501/4; 501/5; 501/17; 501/18
(58) Field of Classification Search .................. 65/25.4, 65/33.4, 33.6, 60.53, 24, 60.51, 106; 501/4, 501/5, 17, 18
See application file for complete search history.

(56) References Cited

U.S. PATENT DOCUMENTS

| | | | |
|---|---|---|---|
| 2,286,275 A | 6/1942 | Hood et al. |
| 4,093,771 A | 6/1978 | Goldstein et al. |
| 4,306,012 A | 12/1981 | Scheve |
| 4,415,624 A | 11/1983 | Prabhu et al. |
| 4,596,590 A | 6/1986 | Boaz |
| 4,649,062 A | 3/1987 | Kosiorek et al. |
| 4,684,389 A | 8/1987 | Boaz |
| 4,770,685 A | 9/1988 | Boaz |
| 4,959,090 A | 9/1990 | Reinherz |
| 4,983,196 A | 1/1991 | Stotka |
| 5,037,783 A | 8/1991 | Boaz |
| 5,149,565 A | 9/1992 | Johnson et al. |
| 5,153,150 A | 10/1992 | Ruderer et al. |
| 5,187,202 A | 2/1993 | Walkowski |
| 5,194,303 A | 3/1993 | Nigrin et al. |
| 5,208,191 A | 5/1993 | Ruderer et al. |
| 5,286,270 A | 2/1994 | Ruderer et al. |
| 5,306,674 A | 4/1994 | Ruderer et al. |
| 5,324,373 A | 6/1994 | Gillner et al. |
| 5,328,753 A | 7/1994 | Boaz |
| 5,332,412 A | 7/1994 | Manabe et al. |
| 5,346,651 A | 9/1994 | Oprosky et al. |
| 5,350,718 A | 9/1994 | Anquetil et al. |
| 5,443,669 A | 8/1995 | Tunker |
| 5,559,059 A | 9/1996 | Ryan |
| 5,616,417 A | 4/1997 | Ryan |
| 5,677,251 A | 10/1997 | Sakoske |
| 5,686,795 A | 11/1997 | Sakoske et al. |
| 5,710,081 A | 1/1998 | Tunker |
| 5,714,420 A | 2/1998 | Sakoske et al. |
| 5,753,685 A | 5/1998 | Sakoske |
| 5,754,005 A | 5/1998 | Sakoske et al. |
| 5,783,507 A | 7/1998 | Sakoske |
| 5,827,789 A | 10/1998 | Tunker et al. |
| 5,900,319 A | 5/1999 | Sakoske |
| 5,925,160 A | 7/1999 | Sakoske |
| 5,939,343 A | 8/1999 | Tunker et al. |
| 5,968,659 A | 10/1999 | Sakoske et al. |
| 6,022,624 A | 2/2000 | Sakoske |
| 6,057,037 A | 5/2000 | Tunker et al. |
| 6,087,282 A | 7/2000 | Panzera et al. |
| 6,105,394 A | 8/2000 | Sridharan et al. |
| 6,171,383 B1 | 1/2001 | Sakoske et al. |
| 6,207,285 B1 | 3/2001 | Sakoske et al. |
| 6,221,147 B1 | 4/2001 | Sakoske et al. |
| 6,238,847 B1 | 5/2001 | Axtell, III et al. |
| 6,255,239 B1 | 7/2001 | Sakoske |
| 6,346,493 B1 | 2/2002 | Kniajer et al. |
| 6,485,838 B1 | 11/2002 | Shimada et al. |
| 6,503,316 B1 | 1/2003 | Sakoske et al. |
| 6,624,104 B2 | 9/2003 | Sakoske et al. |
| 6,680,121 B2 | 1/2004 | Sakoske et al. |
| 6,963,009 B2 | 11/2005 | Leiber et al. |

(Continued)

FOREIGN PATENT DOCUMENTS

WO WO 2004/018376 * 3/2004

OTHER PUBLICATIONS

Gran & Hackh's Chemical Dictionary, 1991, 5$^{th}$ ed, McGraw Hill, p. 86.*

(Continued)

Primary Examiner—John Hoffmann
(74) Attorney, Agent, or Firm—Rankin, Hill & Clark LLP

(57) ABSTRACT

The present invention provides a method of making a decorated multilayer glass structure using a single firing step that includes that use of a crystallizing glass enamel composition that contains ingredients to ensure the complete burnout of the organic portion of the composition upon firing and bending of a mated pair of glass sheets. A benefit of the composition is that when applied to one sheet of a mated pair of glass sheets, it burns out completely during firing and bending of the pair. The presence of high levels of oxidizers in the composition ensures a supply of oxygen to enable combustion of the organic vehicle while firing the glass sheets and prior to the sintering of the enamel composition to only one glass sheet in a mated pair of decorated or colored glass sheets.

15 Claims, No Drawings

U.S. PATENT DOCUMENTS

| | | |
|---|---|---|
| 7,157,025 B2 | 1/2007 | Ichimura et al. |
| 2003/0012962 A1 | 1/2003 | Beyrle |
| 2004/0029703 A1 | 2/2004 | Sridharan et al. |
| 2004/0175407 A1 | 9/2004 | McDaniel |
| 2004/0202795 A1 | 10/2004 | Sakoske |

OTHER PUBLICATIONS

CRC Handbook of Chemisty and Physics, 1985, $66^{th}$ ed. CRC press, p. B-78.*

* cited by examiner

METHOD OF MAKING STAGED BURNOUT ENAMELS FOR SECOND SURFACE FIRING OF MULTILAYER GLASS STRUCTURES

BACKGROUND OF THE INVENTION

1. Field of Invention

The present invention relates to multilayer glass structures, and particularly a method of making multilayer glass structures decorated using crystallizing enamels.

2. Description of Related Art

Crystallizing glass enamel compositions are well known in the art. They can be used for a variety of applications such as, for example, decorative coatings for glassware, chinaware, and the like. They are especially useful in forming colored borders around glass sheets used for automotive windshields, sidelights and backlights. The colored borders enhance appearance as well as prevent UV degradation of underlying adhesives. The crystallizing glass enamels are reactive compositions for they contain components that react and crystallize upon firing.

In general, these enamel compositions consist mainly of a glass frit, a colorant and an organic vehicle. They are applied to a substrate, for example, a sheet of glass, and subsequently fired to burn off the organic vehicle and fuse the frit thus bonding the enamel coating to the substrate. Glass sheets for automotive use are generally coated with the enamel composition and then subjected to a forming process at elevated temperatures. During this treatment the enamel melts and fuses to the glass substrate and the glass is formed into a desired final shape. Such compositions may also be applied to one layer of a multilayer laminate (such as a safety glass windshield) prior to stacking the layers together, whereby the pigment/color is in the interior of the resulting multilayer laminate.

In such case, after application of the enamel by screen printing, for example, the wet film is dried or cured at low temperatures or with UV light to remove the solvents and produce a dried green enamel where the particles are held together by higher molecular weight organic binder molecules. After producing the green enamel layer, it can be overprinted with a conductive silver layer, and at least three additional heating steps at higher temperature are required. The first heating burns off the higher temperature higher molecular weight organic binder molecules and adheres the enamel composition to the first substrate layer. A second heating allows a second glass substrate to be mated and bent together with the first. After insertion of a vinyl sheet (e.g., polyvinylbutyral) between the first and second glass sheets, a third lower temperature heating is then needed to fuse the two glass sheets and the vinyl sheet to form a glass monolith, i.e., a laminated glass windshield pane.

When the glass substrates are stacked using a conventional crystallizing enamel composition when still green, upon firing to form a mated set, the result can be incomplete removal (i.e., combustion) of the higher temperature organic binders, which can cause significant carbon entrapment and degradation of the desired black color of the enamel. In addition, the enamel on the bottom sheet can undesirably adhere to the top sheet, causing damage to either or both.

U.S. Pat. No. 5,443,669 to Tünker discloses a method of making decorated multilayer glass structures wherein both panes of glass are fired together. However, the method of Tünker can lead to the sticking of the panes for such method does not employ a crystallizing glass enamel. Additionally, the method of Tünker employs an inorganic binder comprising special silica gels that do not easily mix with the other components of the enamel composition. Moreover, the Tünker patent teaches the use of lead containing oxidizers or oxidizers containing low levels of oxygen that can insufficiently react with conventional binder materials.

BRIEF SUMMARY OF THE INVENTION

The present invention provides a method of making a decorated multilayer glass structure using a single firing step that includes the use of a crystallizing glass enamel composition that contains ingredients to ensure the complete burnout of the organic portion of the composition upon firing and bending of a mated pair of glass sheets. A benefit of the composition is that when applied to one sheet of a mated pair of glass sheets, it burns out completely during firing and bending of the pair. The presence of high levels of oxidizers in the composition ensures a supply of oxygen to enable combustion of the organic vehicle while firing the glass sheets and prior to the sintering of the enamel composition to only one glass sheet in a mated pair of decorated or colored glass sheets. The enamel composition employs convential organic binder materials and it does not require the use of an inorganic binder such as silica gels. Additionally, the enamel composition and the oxidizer are lead-free.

Typically, the crystallizing enamel composition comprises, prior to firing, a reactive glass frit, an oxidizer component, a pigment, and an organic vehicle. If desired, the composition may further comprise of a seed material. A method of preparing the crystallizing enamel composition comprises combining in no particular order the aforementioned components in desired amounts.

The invention also includes a method of fusing the enamel with glass substrates such as those used in the automotive, architectural/construction, home appliance and beverage industries, e.g., car windshields and other automotive glass, residential and commercial windows, ceramic cooktops and beverage bottles. For example, the enamel composition may be used to form a border, which is colored and/or UV resistant, around the periphery of a pane of automotive glass.

In particular, the green enamel composition comprises, prior to firing, a reactive glass component; an oxidizer component comprising an oxidizer; a pigment; and an organic vehicle. The reactive glass component comprises oxide frits or sulfide frits or both. The oxidizer component comprises a lead-free oxidizer selected from the group consisting of oxides, nitrates, carbonates, borates, fluorates, chlorates, bromates, iodates, sulfates, phosphates, and permanganates, provided that the oxidizer includes at least two atoms of oxygen for every molecule of oxidizer. The enamel composition may optionally further comprise seed material, which promotes crystallization of the enamel composition and is selected from the group consisting of silicates, titanates, aluminates, niobates, and bismuthates, and mixtures thereof.

DETAILED DESCRIPTION OF THE INVENTION

The method of the present invention includes the use of an enamel composition that contains the following components: (1) at least one reactive glass frit (oxides or sulfides or both); (2) at least one oxidizer, (3) a colorant (pigment), and (4) a vehicle for components (1)-(3). The oxidizer is believed to provide molecular oxygen as it decomposes during a firing cycle, which promotes the complete elimination (combustion and/or volatilization) of the organic vehicle prior to sintering of the enamel composition to a glass substrate. The enamel composition is typically applied to one sheet of a pair ("bottom sheet"). The bottom sheet, after the enamel composition is applied, is mated with a second sheet of the pair ("top sheet"). The composition may optionally include a seed material, which is believed to assist in nucleating and growing microcrystalline structures, which helps prevent the top sheet from fusing to the bottom sheet.

Typically, the enamel composition comprises, prior to firing and by weight, 20-80% of a glass component comprising one or more reactive glass frits, 0.01-7% of an oxidizer component, 10-40% of a pigment and 10-40% of an organic vehicle. The enamel composition may further comprise 0.1-20% of a seed material. The enamel composition may alternatively comprise by weight 20-80% of a lower melting (450-550° C.) reactive glass frit and 10-50% of a higher melting (580-680° C.) reactive glass frit. All compositional percentages are by weight and are given for a blend prior to firing. All percentages, temperatures, times, particle sizes and ranges of other values are presumed to be accompanied by the-modifier "about." Details on each ingredient follow.

Glass Component. The glass component, which comprises reactive glass frits, comprises by weight about 20-80% of the enamel composition. The reactive frits may contain oxide frits, sulfide frits or combinations thereof. The term "reactive glass frits" means that at least 30% by weight of the oxides contained in the frits react upon firing to form crystallization products. Suitable oxide frits include borosilicate frits, for example, bismuth borosilicate frits and zinc borosilicate frits. More details on suitable glass frits may be found in U.S. Pat. No. 5,153,150 (Ruderer et al.) and U.S. Pat. No. 6,207,285 (Sakoske et al.), both commonly owned herewith, and both incorporated by reference herein. Representative oxide frits that can be used in the present invention have the compositions, prior to firing, shown in Table 1 below.

oxides of copper, 0-4% oxides of molybdenum, and 0-5% oxides of tungsten. Preferably, each range in this paragraph has a lower bound of 0.1% instead of zero.

Sulfide glass frits are glass frits that contain a metal sulfide component. Sulfide glass frits useful herein are disclosed in U.S. Pat. No. 5,350,718 to Antequil et al., which is hereby incorporated by reference. Exemplary sulfides in such frits include ZnS, MnS, FeS, CoS, NiS, $Cu_2S$, CdS, $Sb_2S_3$ and $Bi_2S_3$. Preferably, the sulfide is ZnS. A glass component containing both oxide and sulfide frits are also envisioned. The glass frits useful herein have melting points in the range of about 450° C. to about 750° C., or any intermediate temperature such as 500° C., 550° C., 580° C., 600° C., 630° C., 650° C., 680° C., or 700° C., and various of the frits may be effectively fired at those temperatures.

The glass frits are formed in a known manner, for example, blending the starting materials (oxides and/or sulfides) and melting together at a temperature of about 1000-1300° C. for about 40 minutes to form a molten glass having the desired composition. The molten glass formed can then be suddenly cooled in a known manner (e.g., water quenched) to form a frit. The frit can then be ground using conventional milling techniques to a fine particle size, from about 1 to about 8 microns, preferably 2 to about 6 microns, and more preferably about 3 to about 5 microns.

Oxidizer Component. The oxidizer component comprises one or more oxidizers, that is, compounds that release molecular oxygen upon decomposition. The oxidizer is lead-free (as is the enamel composition) and such oxidizer comprises at least two oxygen atoms for every molecule of oxidizer. Released oxygen initiates and sustains combustion of the organic vehicle as an enamel coated glass substrate is

TABLE 1

Oxide Frit Compositions.
Ingredient ranges in weight percentage.

| Ingredient | range 1 | range 2 | range 3 | range 4 | range 5 | range 6 | range 7 | range 8 |
|---|---|---|---|---|---|---|---|---|
| $Bi_2O_3$ + ZnO | 1-99 | 5-95 | | | | | | |
| $B_2O_3$ | | | 1-20 | 10-35 | 0.1-9 | 0.1-9 | 21-60 | 21-60 |
| $SiO_2$ | 0.1-28 | 0.1-28 | 5-50 | 5-50 | 0.1-28 | 0.1-28 | 0.1-28 | 0.1-28 |
| $Bi_2O_3$ | | | 15-60 | | 9-75 | 9-75 | 9-75 | |
| ZnO | | | 5-50 | 5-50 | 0.1-11 | | 0.1-11 | 21-50 |

As can be seen above, the composition of the glass frits are not critical. Each frit composition may additionally contain glass-modifying oxide and/or sulfide ingredients as known in the art. Exemplary glass modifying oxides include $TiO_2$, $ZrO_2$, $Al_2O_3$, $K_2O$, $Li_2O$, $Na_2O$, $F_2$, $Nb_2O_5$, $CeO_2$, $Sb_2O_3$, BaO, CaO, SrO, MgO, SnO, $Cr_2O_3$, NiO, CoO, oxides of manganese, for example MnO or $Mn_2O_3$, oxides of iron, for example $Fe_2O_3$ or FeO, oxides of copper, for example CuO or $Cu_2O$, oxides of molybdenum, for example MoO or $Mo_2O_3$, oxides of tungsten, for example $WO_3$ or $WO_2$. Oxides of different oxidation states of the aforementioned metals are also envisioned. Also envisioned are glass frits, which intentionally include PbO and/or CdO, or frits which intentionally exclude them, depending on desired performance and environmental considerations.

Broadly, useful amounts of such additional oxides include 0-10% $TiO_2$, 0-7% $ZrO_2$, 0-7% $Al_2O_3$, 0-10% $K_2O$, 0-5% $Li_2O$, 0-15% $Na_2O$, 0-7% $F_2$, 0-4% $Nb_2O_5$, 0-4% $CeO_2$, 0-4% $Sb_2O_3$, 0-20% BaO, 0-20% CaO, 0-20% SrO, 0-10% MgO, 0-20% SnO, 0-10% $Cr_2O_3$, 0-8% NiO, 0-10% CoO, 0-25% oxides of manganese, 0-20% oxides of iron, 0-10% fired. Depending on the firing profile of the enamel compositions, suitable combinations of oxidizers are chosen to provide adequate oxygen to ensure complete burnout of the organic vehicle. It is necessary that the oxidizers decompose and that the organic vehicle burns out before the onset of sintering of the frit. If sintering precedes oxidizer decomposition, then carbon ash may be trapped within the enamel in the last moments of sintering, thereby causing graying and blistering of the black enamel. Such a result would be unacceptable in any application. Such a porous glass-ceramic film would have poor scratch resistance and mechanical integrity and may not adhere sufficiently to the glass sheet to which it was applied, and/or may not adhere sufficiently to the laminate during the laminating heating process, which could eventually cause poor structural integrity or delamination.

Particle size may have an effect on the efficacy of the oxidizer. The oxidizer particle size should be about the same as the glass frit particle size. In fact, the oxidizer may be ground together with the glass fit to ensure uniform distribution of oxidizer throughout the ceramic enamel paste composition that is applied between the glass sheets prior to firing.

Oxidizers such as bismuth oxynitrate ground to average particle sizes ($D_{50}$) of 8-13 µm are useful. Others such as manganese dioxide particles having $D_{50}$ in the range of 1-5 µm have also been found to be useful. Oxidizers useful in the practice of the present invention include any that evolve oxygen at a temperature within a firing temperature profile of a decorative ceramic enamel composition.

Suitable oxidizers include, in general, oxides, peroxides, nitrates, oxynitrates, chlorates, bromates, sulfates and phosphates, provided they release molecular oxygen upon decomposition at a temperature within the firing temperature range used to fire and fuse the ceramic enamel composition to a glass sheet in the process of making a laminated glass structure. In particular, oxidizers envisioned as useful in the invention include oxides and peroxides of antimony, bismuth, calcium, magnesium, manganese, nickel, potassium, sodium, strontium, tellurium or zinc; nitrates and oxynitrates of barium, bismuth, calcium, cesium, cobalt, copper, lithium, magnesium, potassium, sodium, strontium, or tin; chlorates of sodium or potassium; bromates of sodium or potassium; sulfates of sodium or potassium; and phosphates of sodium or potassium. Bismuth oxynitrate, sodium nitrate and ammonium nitrate, each alone or in any combination, perform the best for second surface enamel applications. Exemplary oxides are presented in Table 2. In one embodiment, the oxidizer component comprises bismuth oxynitrate and manganese dioxide in a weight ratio of about 1:2 to about 2:1. In another embodiment, the oxidizer component comprises manganese dioxide and sodium nitrate in a weight ratio of about 15:1 to about 2:1.

TABLE 2

Oxidizers and their decomposition temperatures.

| Compound | Formula | Melt point °C. (decomposes) | Boiling point °C. (decomposes) |
|---|---|---|---|
| Ammonium nitrate | $NH_4NO_3$ | 169.6 | 210 |
| Antimony pentoxide | $Sb_2O_5$ | 380 | |
| Barium nitrate | $Ba(NO_3)_2$ | 592 | |
| Bismuth pentoxide | $Bi_2O_5$ | 150 | 357 |
| Bismuth oxynitrate | $BiONO_3$ | 260 | 335 |
| Bismuth tetroxide | $Bi_2O_4$ | 305 | |
| Calcium nitrate | $Ca(NO_3)_2$ | 561 | |
| Calcium peroxide | $CaO_2$ | 275 | |
| Cesium nitrate | $CsNO_3$ | 414 | |
| Cobalt nitrate | $Co(NO_3)_2$ | 100 | |
| Copper nitrate | $Cu(NO_3)_2$ | 255 | |
| Lithium nitrate | $LiNO_3$ | 253 | |
| Magnesium peroxide | $MgO_2$ | 100 | |
| Manganese dioxide | $MnO_2$ | 535 | |
| Nickel (III) oxide | $Ni_2O_3$ | 600 | |
| Platinum dioxide | $PtO_2$ | 450 | |
| Potassium bromate | $KBrO_3$ | 370 | 434 |
| Potassium chlorate | $KClO_3$ | 368 | 400 |
| Potassium iodate | $KIO_3$ | 560 | |
| Potassium nitrate | $KNO_3$ | 337 | 400 |
| Potassium peroxide | $K_2O_2$ | 490 | |
| Silver nitrate | $AgNO_3$ | 212 | |
| Sodium bromate | $NaBrO_3$ | 381 | |
| Sodium chlorate | $NaClO_3$ | 248 | |
| Sodium nitrate | $NaNO_3$ | 306.8 | 380 |
| Sodium percarbonate | $2Na_2CO_3 \cdot 3H_2O_2$ | 50 | |
| Sodium peroxide | $Na_2O_2$ | 460 | 657 |
| Strontium nitrate | $Sr(NO_3)_2$ | 570 | 645 |
| Strontium peroxide | $SrO_2$ | 215 | |
| Tellurium trioxide | $TeO_3$ | 430 | |
| Tin nitrate | $Sn(NO_3)_4$ | 50 | |
| Zinc peroxide | $ZnO_2$ | 150 | 212 |

Pigments. The finely ground glass frit can be combined with a mixed metal oxide pigment. Typical mixed metal oxide pigments used to produce black colors in the automotive industry include oxides of copper, chromium, iron, cobalt, nickel, manganese, and other transition metals. Although black spinel pigments are preferred for use in the automotive industry, metal oxide pigments that produce colors other than black may be combined with the glass frits herein. The pigment generally constitutes about 10 to about 40% of the enamel compositions herein, depending upon the range of color, gloss, and opacity desired.

Useful pigments may come from several of the major classifications of complex inorganic pigments, including corundum-hematite, olivine, priderite, pyrochlore, rutile, spinel, and spinel, though other categories such as baddeleyite, borate, garnet, periclase, phenacite, phosphate, sphene and zircon may be suitable in certain applications. For example, cobalt silicate blue olivine $Co_2SiO_4$; nickel barium titanium primrose priderite $2NiO:3BaO:17TiO_2$; lead antimonite yellow pyrochlore $Pb_2Sb_2O_7$; nickel antimony titanium yellow rutile $(Ti,Ni,Nb)O_2$; nickel niobium titanium yellow rutile $(Ti,Ni,Nb)O_2$; nickel tungsten yellow rutile $(Ti,Ni,W)O_2$; chrome antimony titanium buff $(Ti,Cr,Sb)O_2$; chrome niobium titanium buff rutile $(Ti,Cr,Nb)O_2$; chrome tungsten titanium buff rutile $(Ti,Cr,W)O_2$; manganese antimony titanium buff rutile $(Ti,Mn,Sb)O_2$; titanium vanadium grey rutile $(Ti,V,Sb)O_2$; manganese chrome antimony titanium brown rutile $(Ti,Mn,Cr,Sb)O_2$; manganese niobium titanium brown rutile $(Ti,Mn,Nb)O_2$; cobalt aluminate blue spinel $CoAl_2O_4$; zinc chrome cobalt aluminum spinel $(Zn,Co)(Cr,Al)_2O_4$; cobalt chromate blue-green spinel $CoCr_2O_4$; cobalt titanate green spinel $Co_2TiO_4$; iron chromite brown spinel $Fe(Fe,Cr)_2O_4$; iron titanium brown spinel $Fe_2TiO_4$; nickel ferrite brown spinel $NiFe2O_4$; zinc ferrite brown spinel $(Zn,Fe)Fe_2O_4$; zinc iron chromite brown spinel $(Zn,Fe)(Fe,Cr)_2O_4$; copper chromite black spinel $CuCr_2O_4$; iron cobalt chromite black spinel $(Co,Fe)(Fe,Cr)_2O_4$; chrome iron manganese brown spinel $(Fe,Mn)(Cr,Fe)_2O_4$; chrome iron nickel black spinel $(Ni,Fe)(Cr,Fe)_2O_4$; and chrome manganese zinc brown spinel $(Zn,Mn)(Cr_2O_4)$.

The enamel compositions of the invention may also contain up to about 15% of one or more fillers such as silica and alumina, and other conventional additives, such as iron, silicon, zinc and the like to enhance desired properties, such as resistance to silver bleed-through. The filler may alternately be refractory oxide fillers such as boro-alumina-silicates, alumina-silicates, calcium silicates, soda-calcia-alumina-silicates, wollastonite, feldspar, titanates, and combinations thereof.

Seed Material. The enamel compositions may optionally contain up to about 20% (e.g., 0.1-20% or 2-10%) of a seed material such as bismuth silicates, zinc silicates, and bismuth titanates. The seed materials may include, without limitation, one or more of $Zn_2SiO_4$, $Bi_{12}SiO_{20}$, $Bi_4(SiO_4)_3$, $Bi_2SiO_5$, $2ZnO \cdot 3TiO_2$, $Bi_2O_3 \cdot SiO_2$, $Bi_2O_3 \cdot 2TiO_2$, $2Bi_2O_3 \cdot 3TiO_2$, $Bi_7Ti_4NbO_{21}$, $Bi_4Ti_3O_{12}$, $Bi_2Ti_2O_7$, $Bi_{12}TiO_{20}$, $Bi_4Ti_3O_{12}$, and $Bi_2Ti_4O_{11}$. U.S. Pat. No. 6,624,104 (Sakoske et al.) and U.S. Pat. No. 5,208,191 (Ruderer, et al.) provide further information on seed material; both patents are commonly owned herewith and incorporated by reference.

Organic Vehicle. The foregoing solid ingredients are combined with an organic vehicle to form the green enamel composition, which is a paste. The green enamel paste in general contains 60 to 90% solids as above described and 10 to 40% of an organic vehicle. The viscosity of the paste is adjusted so that it can be screen-printed, roll coated or sprayed onto the desired substrate.

The organic vehicle comprises a binder and a solvent, which are selected based on the intended application. It is essential that the vehicle adequately suspend the particulates (i.e., frit, oxidizer, pigment, seed) and burn off completely upon firing. In particular, binders including methyl cellulose, ethyl cellulose, and hydroxypropyl cellulose, and combinations thereof, may be used. Suitable solvents include propylene glycol, diethylene glycol butyl ether; 2,2,4-trimethyl pentanediol monoisobutyrate (Texanol™); alpha-terpineol; beta-terpineol; gamma terpineol; tridecyl alcohol; diethylene glycol ethyl ether (Carbitol™), diethylene glycol butyl ether (Butyl Carbitol™); pine oils, vegetable oils, mineral oils, low molecular weight petroleum fractions, tridecyl alcohols, and synthetic or natural resins and blends thereof. Surfactants and/or other film forming modifiers can also be included. The solvent and binder may be present in a weight ratio of about 50:1 to about 20:1. The preferred vehicle is a combination of Butyl Carbitol™ (diethylene glycol monobutyl ether) and ethyl cellulose in a weight ratio of about 200:1 to about 20:1, 50:1 to about 20:1, more preferably about 40:1 to about 25:1.

The enamel composition does not require the use of inorganic binders such as silica gels. Preferably, the enamel composition contains less than 3% by weight silica gels since such materials are difficult to mix with the other components of the enamel composition. More preferably, the enamel composition is substantially free of silica gels. Preferably, the vehicle can be dried and substantially all of the solvents are removed at a temperature of less than 200° C.

In general, the enamel pastes are viscous in nature, with the viscosity depending upon the application method to be employed and end use. For purposes of screen-printing, viscosities ranging from 10,000 to 80,000, preferably 15,000 to 35,000 centipoise, and more preferably 18,000 to 28,000 centipoise at 20° C., as determined on a Brookfield Viscometer, #29 spindle at 10 rpm, are appropriate.

Method. A glass substrate may be colored or decorated by applying a pigment-containing enamel composition to at least one surface of a glass sheet and firing the glass sheet. In particular, a method of forming a decorated glass structure comprises applying to a first glass substrate a green crystallizing enamel composition comprising, prior to firing, a glass component, an organic vehicle, an oxidizer component and a pigment, drying the vehicle at a low temperature to remove solvents, stacking a second glass substrate with the first glass substrate wherein the green enamel composition lies between the first and second glass substrates; subjecting the stacked glass substrates to a firing operation whereby the enamel fuses to only one of the glass substrates, the organic vehicle burns out completely and the glass substrates do not stick together. The enamel composition may further comprise a seed material. The oxidizer component comprises an oxidizer that decomposes to release molecular oxygen, selected from the group consisting of oxides, nitrates, carbonates, borates, fluorates, chlorates, bromates, iodates, sulfates, phosphates, manganates, and permanganates. The method may include a glass forming step whereby the glass panes are bent together to form a mated pair.

Furthermore, a method of forming a glass substrate provided with an enamel coating is envisioned, which comprises (a) applying a green crystallizing enamel composition to a glass substrate; (b) heating the coated glass to an elevated temperature, preferably at least about 570° C.; (c) subjecting the heated glass to a forming pressure, e.g., gravity sag or press bending in the range of 0.1 to 5 psi, typically about 2 psi, with a forming die; and (d) separating the formed glass from the die. The enamel composition may be applied to the entire surface of a glass substrate, or to only a portion thereof, for example the periphery.

A method of coating and coloring a glass substrate is also provided, wherein the enamel compositions are applied to first side of a first glass substrate (e.g., sheet of glass). Typically, this is the "second surface" of an automotive windshield, as is known in the art. A second glass substrate is stacked with the first substrate, whereby the enamel composition lies between the first and second substrates. The stacked substrates are placed in a mold and fired at a temperature sufficient to sinter the enamel and fuse it to the first glass substrate (e.g., about 570° C. to about 680° C.). The mated glass sheets, one now having a ceramic decoration, are separated from the mold and from one another, whereby they do not stick to the mold or to one another. It is advantageous at that the sheets, after firing, do not stick to one another because they are often further processed to make a laminated (safety glass) windshield. In such case, a laminating film such as polyvinyl butyral (PVB) is inserted between the glass sheets, and the sheets and PVB are heated to fuse them together. Were the sheets to stick to one another after the above-mentioned firing step, the further processing may be frustrated or impossible, and mechanical and/or optical defects can occur.

To prepare an enamel composition of the invention, a frit is ground to a fine powder using conventional methods and is combined in any order with a seed material, a pigment, optional fillers, and a vehicle. Other oxides, as discussed above, can be added, as well as materials that resist silver bleed-through. More than one type of each of the components mentioned herein may be present in the enamel composition. Prior to blending all enamel composition ingredients, the oxidizer may be first intimately mixed with a solvent such as propylene glycol, or another aforementioned solvent. Typically, this ratio of oxidizer to solvent in such a mix is from about 1:20 to about 1:4, preferably about 1:15 to about 1:5. Oxidizer may be added to the enamel composition and the glass frits when mixing with the organic vehicle. Alternatively, the oxidizer could be dissolved or dispersed in the organic vehicle before otherwise mixing with the remaining ingredients.

The enamel composition can be applied to a glass substrate in a conventional manner, such as by screen-printing, decal application, spraying, brushing, roller coating, and the like. Screen-printing is preferred when the composition is applied to glass substrates. After application of the composition to a substrate in a desired pattern, the applied coating is then fired to bond the enamel to the substrate. The firing temperature is generally determined by the frit maturing temperature. Typically, the firing range for the composition is about 570-680° C., more preferably about 570-650° C., and most preferably about 570-620° C.

EXAMPLES

The following compositions represent exemplary embodiments of the invention. They are presented to explain the invention in more detail, and do not limit the invention.

The abbreviations in the Tables have the following meanings: Glass Component is a blend of a zinc borosilicate frit and a bismuth borosilicate frit. Pigment is a black inorganic copper chromite spinel pigment. Pigment+$NH_4NO_3$ is 0.3% ammonium nitrate dry ground with the black Pigment. Seed 1 is a bismuth silicate seed material. Seed 2 is a zinc silicate seed material. Organic Vehicle is 97.25% butyl carbitol and 2.75% ethyl cellulose, standard grade 45. $BiONO_3$ is bismuth subnitrate (also known as bismuth oxy-nitrate) having a $D_{50}$ particle size of 8-13 microns. $MnO_2$ is manganese dioxide having a $D_{50}$ particle size of less than 5 microns.

The frits, pigments and seed materials, Frit 1 through Seed 2, as presented in Table 3, below ("Dry Enamel") were weighed and mixed together in a blender. The blended Dry Enamel was mixed with the Organic Vehicle using a Hobart type mixer, to wet the Dry Enamel materials. After the mixture was wetted, the oxidizers $BiONO_3$, $MnO_2$, and oxidizer blends $NaNO_3$+propylene glycol (PG) and/or $NH_4NO_3$+PG were added, along with an additional portion of butyl carbitol to make slight adjustments to the viscosity. The wet paste material was then milled on a three-roll mill. Final viscosity adjustments are made by addition of butyl carbitol solvent. The paste batch contained the ingredients in Tables 3 and 4, below.

TABLE 3

Enamel composition dry ingredients.

| Ingredient | Weight (grams) |
|---|---|
| Glass component | 5292.5 |
| Pigment | 1667.5 |
| Seed 1 | 217.5 |
| Seed 2 | 72.5 |
| $BiONO_3$ Oxidizer | 7.2 |
| $MnO_2$ Oxidizer | 7.2 |
| Total Dry Enamel + Oxidizers | 7264.4 |

To the blended frits, pigments and seed materials, the organic vehicle, oxidizer, and additional solvent is added, according to Table 4.

TABLE 4

Organic vehicle, oxidizer and solvent added to form paste.

| Ingredient | Weight (grams) |
|---|---|
| Organic Vehicle | 1338.0 |
| 6% $NaNO_3$ + 94% PG | 104.1 |
| Solvent | 48.0 |

The final resulting paste formula is presented in Table 5.

TABLE 5

Final paste composition.

| Ingredient | Weight (grams) |
|---|---|
| Enamel + Oxidizers | 7264.4 |
| Organic Vehicle | 1338.0 |
| 10% $NH_4NO_3$ + 90% PG | 104.0 |
| Butyl Carbitol Solvent | 48.0 |
| Total paste composition | 8754.4 |

When sampled for second surface firing and testing, the formulations were varied as in Table 6, below. Each sample contained 6 grams of the dry ingredients and the specified amount of the other ingredients. The glass component (i.e., frits), pigment and seed materials were weighed and mixed together in a blender to form a homogeneous blend of the above dry ingredients. In the case of samples 1 and 2, below, the $BiONO_3$ and $MnO_2$ were added in the blending step. The dry powder was placed into a mixing container with the organic vehicle and oxidizer solutions. The materials were mixed together for 10 minutes, wetting the dry materials with the organic vehicle and oxidizer solutions. The mixed paste material was milled using a triple roll mill to further wet and disperse the enamel material into the vehicle. Final viscosity adjustments were made using butyl carbitol solvent.

TABLE 6

Exemplary tested enamel compositions.

| | sample number | | | |
|---|---|---|---|---|
| ingredient (wt %) | 1 | 2 | 3 | 4 |
| Glass component | 59.13 | 59.09 | 59.18 | 57.63 |
| Pigment | 18.63 | 18.62 | | 18.16 |
| Pigment + 0.3% $NH_4NO_3$ | | | 18.65 | |
| Seed 1 | 2.43 | 2.43 | 2.43 | 2.37 |
| Seed 2 | 0.81 | 0.81 | 0.81 | 0.79 |
| $BiONO_3$ | 0.05 | 0.08 | | |
| $MnO_2$ | 0.05 | 0.08 | | |
| 6% $NaNO_3$ + 94% propylene glycol | | | 1.35 | |
| 10% $NH_4NO_3$ + 90% propylene glycol | 1.35 | 1.35 | | 2.63 |
| Organic Vehicle | 17.55 | 17.54 | 17.57 | 18.42 |

The above paste compositions were screen printed as 3"×3" (7.6 cm×7.6 cm) squares using a 230 mesh polyester screen onto 4"×4" (10.2 cm×10.2 cm) soda lime glass panels and dried at 115° C. for 8 minutes. The printed panels were laid flat with the print side up and an additional blank 4"×4" (10.2 cm×10.2 cm) soda lime glass panel was stacked on top of the printed surface. The stacked glass panels were then fired for the specified time (6 or 8 minutes) at the specified temperature, e.g., 1100° F., 1120° F., 1140° F. (593° C., 604° C., 616° C.). Table 7 presents the appearance results from the firing of the specified enamel composition after separation of the glass panels.

TABLE 7

Fired enamel appearance (color and burnout)

| | Temperature | | |
|---|---|---|---|
| Run | 1100° F. (8 min) | 1120° F. (8 min) | 1140° F. (6 min) |
| 1 | Good | Good | Good |
| 2 | Excellent | Excellent | Excellent |
| 3 | Excellent | Excellent | Excellent |
| 4 | Excellent | Excellent | Excellent |

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

What is claimed is:

1. A method of forming a decorated glass structure comprising:
   a. applying to a first glass substrate a green crystallizing enamel composition comprising, prior to firing:
      i. a reactive glass component,
      ii. an oxidizer component comprising at least two oxidizers selected from the group consisting of ammonium nitrate, antimony pentoxide, barium nitrate, bismuth pentoxide, bismuth oxynitrate, bismuth tetroxide, calcium nitrate, calcium peroxide, cesium nitrate, cobalt nitrate, copper nitrate, lithium nitrate, magnesium peroxide, manganese dioxide, nickel (III) oxide, platinum monoxide, platinum dioxide, potassium nitrate, potassium peroxide, sodium nitrate, sodium percarbonate, sodium peroxide, strontium nitrate, strontium peroxide, silver nitrate, tellurium trioxide, tin nitrate, and zinc peroxide and combinations thereof,
iii. a pigment,
iv. an organic vehicle comprising a binder and a solvent, and
v. a seed material selected from the group consisting of $Zn_2SiO_4$, $Bi_{12}SiO_{20}$, $Bi_4(SiO_4)_3$, $Bi_2SiO_5$, $2ZnO.3TiO_2$, $Bi_2O_3.SiO_2$, $Bi_2O_3.2TiO_2$, $2Bi_2O_3.3TiO_2$, $Bi_7Ti_4NbO_{21}$, $Bi_4Ti_3O_{12}$, $Bi_2Ti_2O_7$, $Bi_{12}TiO_{20}$, $Bi_4Ti_3O_{12}$, $Bi_2Ti_4O_{11}$, and combinations thereof, wherein the green ceramic enamel composition is substantially free of silica gels,
b. stacking a second glass substrate with the first glass substrate wherein the green crystallizing enamel composition lies between the first and second glass substrates, and
c. subjecting the stacked glass substrates to a firing operation whereby:
i. only the first glass substrate bears a sintered enamel composition,
ii. the organic vehicle burns out completely, and
iii. the glass substrates do not stick to one another.

2. The method of claim 1 wherein the crystallizing enamel composition comprises:
a. 20-80 wt % of the glass component,
b. 0.01-7 wt % of the oxidizer component,
c. 10-40% of the pigment, and
d. 10-40 wt % of the organic vehicle.

3. The method of claim 2 wherein the oxidizer component comprises an oxidizer selected from the group consisting of ammonium nitrate, bismuth oxynitrate, sodium nitrate, and manganese dioxide and combinations thereof.

4. The method of claim 1 wherein the oxidizer component comprises bismuth oxynitrate and manganese dioxide in a weight ratio of about 1:2 to about 2:1.

5. The method of claim 1 wherein the oxidizer component comprises manganese dioxide and sodium nitrate in a weight ratio of about 15:1 to about 2:1.

6. The method of claim 1 wherein the reactive glass component comprises at least one frit, wherein the at least one frit is selected from the group consisting of bismuth borosilicate fit, zinc borosilicate frit, and combinations thereof, wherein:
a. the bismuth borosilicate frit comprises
i. 9-75 wt % $Bi_2O_3$,
ii. 0.1-28 wt % $SiO_2$, and
iii. 0.1-9 wt % $B_2O_3$,
b. the zinc borosilicate fit comprises
i. 21-50 wt % $ZnO_2$,
ii. 0.1-28 wt % $SiO_2$, and
iii. 21-60 wt % $B_2O_3$.

7. The method of claim 1 wherein the glass component comprises:
a. 15-60 wt % $Bi_2O_3$,
b. 5-50 wt % $SiO_2$,
c. 1-20 wt % $B_2O_3$, and
d. 5-50 wt % $ZnO_2$.

8. The method of claim 1 wherein the organic vehicle comprises:
a. a binder selected from the group consisting of methyl cellulose, ethyl cellulose, and hydroxypropyl cellulose, and combinations thereof, and
b. a solvent selected from the group consisting of diethylene glycol butyl ether; 2,2,4-trimethyl pentanediol monoisobutyrate; alpha-terpineol; beta-terpineol; gamma terpineol; tridecyl alcohol; diethylene glycol ethyl ether, diethylene glycol dibutyl ether; and blends thereof.

9. The method of claim 8 wherein the solvent and the binder are present in a weight ratio of about 50:1 to about 20:1.

10. The method of claim 1 wherein the firing operation is conducted at a temperature within the range of about 500° C. to about 750° C.

11. The method of claim 1 wherein the crystallizing enamel composition comprises, prior to firing:
a. 20-80 wt % of the reactive glass component, wherein the reactive glass component includes one selected from the group consisting of reactive oxide-frit, reactive sulfide-frit and combinations thereof, having a melting point of about 450° C. to about 550° C.,
b. 0.1-7 wt % of the oxidizer component, wherein the oxidizer component comprises at least one of the following:
i. bismuth oxynitrate having a $D_{50}$ within the range of 8-13 microns,
ii. manganese dioxide having a $D_{50}$ within the range of 1-5 microns,
iii. ammonium nitrate, and
iv. sodium nitrate,
c. 10-30 wt % of the pigment
d. 1-5 wt % of a bismuth containing crystal seed material
e. 0-7 wt % of a zinc containing crystal seed material, and
f. 10-40 wt % of the organic vehicle, wherein the organic vehicle comprises
i. 0.5-5 wt % of ethyl cellulose and
ii. 95-99.5 wt % of diethylene glycol monobutyl ether.

12. The method of claim 11 wherein the crystallizing enamel composition further comprises 10-50 wt % of a reactive frit having a melting point within the range of about 580° C. to about 680° C.

13. The method of claim 11, further comprising forming the fired glass by a process selected from the group consisting of: (1) subjecting the glass to a forming pressure with a die and separating the formed glass from the die and (2) subjecting the glass to a gravity sag.

14. The method of claim 1, wherein the oxidizer component comprises bismuth oxynitrate and manganese dioxide.

15. The method of claim 1, wherein the oxidizer component comprises ammonium nitrate and sodium nitrate.

* * * * *